(12) United States Patent
Matsuzaki et al.

(10) Patent No.: US 10,491,818 B2
(45) Date of Patent: Nov. 26, 2019

(54) WORK VEHICLE WITH MONITOR TO DISPLAY OVERHEAD IMAGE OF WORK VEHICLE, AND IMAGE DISPLAYING METHOD FOR DISPLAYING OVERHEAD IMAGE OF WORK VEHICLE

(71) Applicant: Kubota Corporation, Osaka-shi (JP)

(72) Inventors: Yushi Matsuzaki, Sakai (JP);
Yoshitomo Fujimoto, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 384 days.

(21) Appl. No.: 15/385,753

(22) Filed: Dec. 20, 2016

(65) Prior Publication Data
US 2018/0027179 A1    Jan. 25, 2018

(30) Foreign Application Priority Data
Jul. 19, 2016    (JP) .................................. 2016-141292

(51) Int. Cl.
| | |
|---|---|
| *H04N 7/18* | (2006.01) |
| *H04N 5/232* | (2006.01) |
| *A01D 41/12* | (2006.01) |
| *B60R 1/00* | (2006.01) |
| *G01S 19/13* | (2010.01) |

(Continued)

(52) U.S. Cl.
CPC ......... *H04N 5/23238* (2013.01); *A01D 41/12* (2013.01); *B60R 1/00* (2013.01); *E02F 5/08* (2013.01); *E02F 9/261* (2013.01); *G01S 19/13* (2013.01); *G06K 9/00805* (2013.01); *H04N 5/23212* (2013.01); *H04N 5/23293* (2013.01); *H04N 7/181* (2013.01); *B60R 2300/105* (2013.01); *B60R 2300/303* (2013.01); *B60R 2300/607* (2013.01); *B60R 2300/70* (2013.01);
(Continued)

(58) Field of Classification Search
CPC ............... H04N 5/23238; H04N 7/181; H04N 5/23212; H04N 5/23293; E02F 9/261; E02F 5/08; E02F 3/18; G01S 19/13; A01D 41/12; B60R 2300/303; B60R 2300/80; B60R 2300/105; B60R 2300/607; B60R 1/00; B60R 2300/70; B60R 2300/8093
USPC .......................................................... 348/39
See application file for complete search history.

(56) References Cited

U.S. PATENT DOCUMENTS

| | | | | |
|---|---|---|---|---|
| 2,754,020 A | * | 7/1956 | Dunn ..................... | B62D 49/02 |
| | | | | 187/222 |
| 9,654,740 B2 | * | 5/2017 | Galarraga .............. | H04N 7/183 |

(Continued)

FOREIGN PATENT DOCUMENTS

JP    2015-104375    6/2015

*Primary Examiner* — Shan E Elahi
(74) *Attorney, Agent, or Firm* — Mori & Ward, LLP (57) ABSTRACT

A work vehicle includes circuitry configured to determine a focused area based on signals detected by work and travel situation detection sensors. The circuitry is configured to determine a prioritized display image among images captured by cameras, the prioritized display image including the focused area. The circuitry is configured to compose the images captured by the cameras by view-point converting the images to generate an overhead image around the vehicle body. The circuitry is configured to generate at least one monitor display image including a first display area in which the overhead image is displayed and a second display area in which the prioritized display image is displayed.

9 Claims, 4 Drawing Sheets

(51) Int. Cl.
    *E02F 5/08*         (2006.01)
    *E02F 9/26*         (2006.01)
    *G06K 9/00*        (2006.01)
    *E02F 3/18*         (2006.01)

(52) U.S. Cl.
    CPC ... *B60R 2300/80* (2013.01); *B60R 2300/8093* (2013.01); *E02F 3/18* (2013.01)

(56) References Cited

U.S. PATENT DOCUMENTS

| | | | |
|---|---|---|---|
| 2006/0208169 A1* | 9/2006 | Breed | B60N 2/002 250/221 |
| 2007/0057781 A1* | 3/2007 | Breed | B60K 35/00 340/457.1 |
| 2013/0147958 A1* | 6/2013 | Mitsuta | B60R 1/00 348/148 |
| 2015/0201543 A1* | 7/2015 | Willibald | A01B 33/16 172/122 |
| 2016/0117902 A1* | 4/2016 | Baillargeon | G08B 21/02 182/18 |
| 2016/0200252 A1* | 7/2016 | Oota | G06K 9/00805 701/50 |
| 2016/0341041 A1* | 11/2016 | Puura | G01S 17/42 |

\* cited by examiner

WORK VEHICLE WITH MONITOR TO DISPLAY OVERHEAD IMAGE OF WORK VEHICLE, AND IMAGE DISPLAYING METHOD FOR DISPLAYING OVERHEAD IMAGE OF WORK VEHICLE

CROSS-REFERENCE TO RELATED APPLICATIONS

The present application claims priority under 35 U.S.C. § 119 to Japanese Patent Application No. 2016-141292, filed Jul. 19, 2016. The contents of this application are incorporated herein by reference in their entirety.

BACKGROUND OF THE INVENTION

Field of the Invention

The present invention relates to a work vehicle and an image displaying method for a work vehicle.

Discussion of the Background

A combine according to Japanese Patent Application Laid-open No. 2015-104375 generates, from images around the combine captured by four cameras, an overhead image that is a pseudo image with the combine viewed from above, composes into the overhead image a planar view image of the combine, which is stored in a storage unit, an image showing positions of crawlers, and a virtual crawler-extended portion that is a line extended forward from edges in left and right directions of the crawlers, and displays the composed overhead image. When it is determined that the combine is moving forward, the combine displays the virtual crawler-extended portion extended forward. When it is determined that the combine is moving backward, the combine displays the virtual crawler-extended portion extended backward.

SUMMARY OF THE INVENTION

According to one aspect of the present invention, a work vehicle includes a vehicle body, cameras, work and travel situation detection sensors, at least one monitor, and circuitry. The cameras are provided on the vehicle body to capture images around the vehicle body. The work and travel situation detection sensors are provided on the vehicle body to detect work and travel situations. The at least one monitor is provided in the vehicle body to display at least one monitor display image. The circuitry is configured to determine a focused area based on signals detected by the work and travel situation detection sensors. The circuitry is configured to determine a prioritized display image among the images captured by the cameras, the prioritized display image including the focused area. The circuitry is configured to compose the images captured by the cameras by view-point converting the images to generate an overhead image around the vehicle body. The circuitry is configured to generate the at least one monitor display image including a first display area in which the overhead image is displayed and a second display area in which the prioritized display image is displayed.

According to another aspect of the present invention, an image displaying method for a work vehicle includes capturing vehicle surrounding images around a vehicle body of the work vehicle. The work and travel situations of the work vehicle are detected. A focused area is determined based on the work and travel situations. A prioritized display image is determined among the vehicle surrounding images. The prioritized display image includes the focused area. The vehicle surrounding images are composed by view-point converting the vehicle surrounding images to generate an overhead image around the vehicle body. At least one monitor display image is generated. The at least one monitor display image includes a first display area in which the overhead image is displayed and a second display area in which the prioritized display image is displayed. The at least one monitor display image is displayed in at least one monitor.

According to further aspect of the present invention, a work vehicle includes a vehicle body, cameras, work and travel situation detection sensors, at least one monitor, a first processor, a second processor, an image composer, and an image generator. The cameras are provided on the vehicle body to capture images around the vehicle body. The work and travel situation detection sensors are provided on the vehicle body to detect work and travel situations. The at least one monitor is provided in the vehicle body to display at least one monitor display image. The first processor is to determine a focused area based on signals detected by the work and travel situation detection sensors. The second processor is to determine a prioritized display image among the images captured by the cameras, the prioritized display image including the focused area. The image composer is to compose the images captured by the cameras by view-point converting the images to generate an overhead image around the vehicle body. The image generator is to generate the at least one monitor display image including a first display area in which the overhead image is displayed and a second display area in which the prioritized display image is displayed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF EMBODIMENTS

The embodiments will now be described with reference to the accompanying drawings, wherein like reference numerals designate corresponding or identical elements throughout the various drawings.

Figure 1:
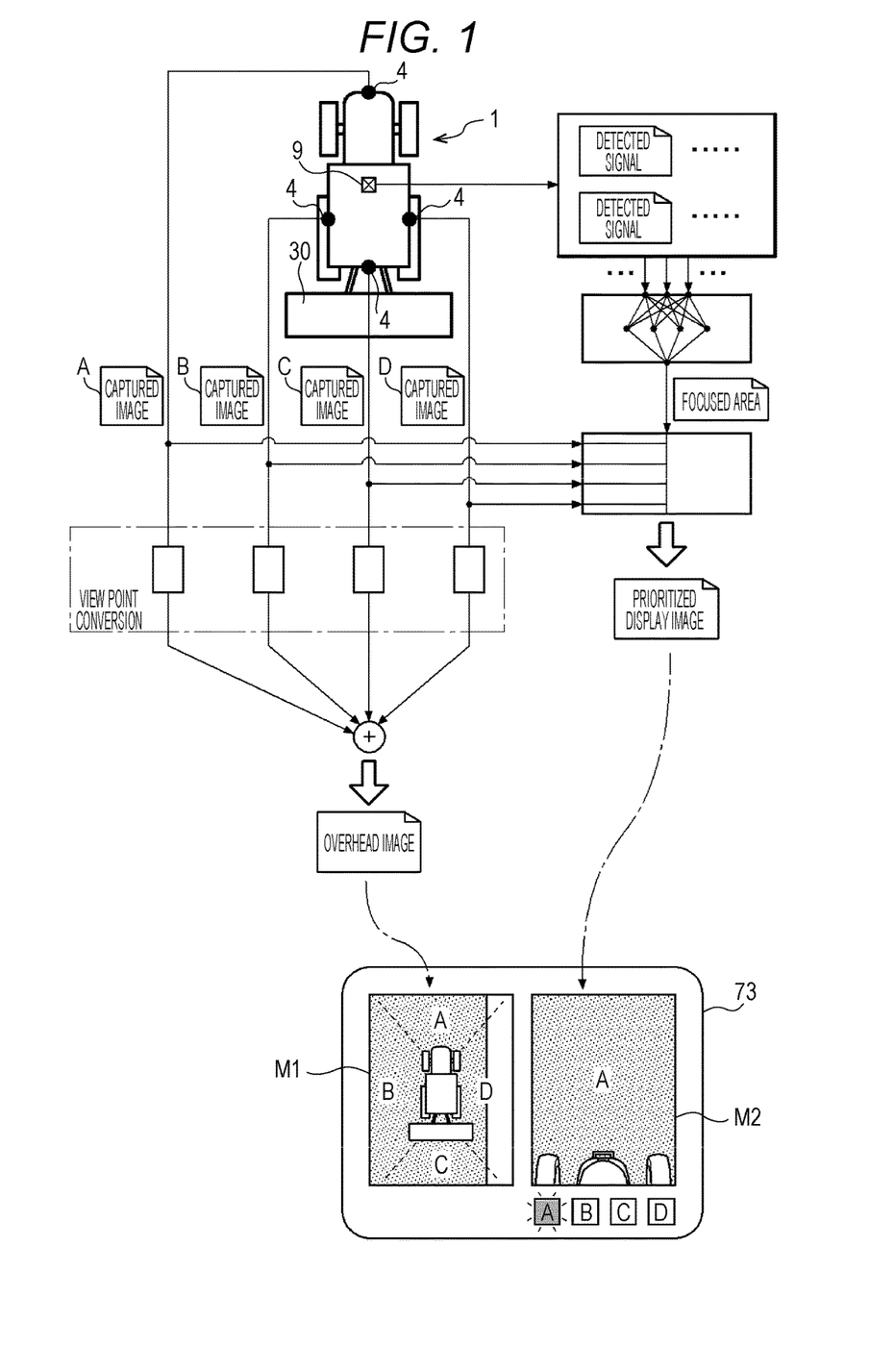
FIG. 1 is a view illustrating a basic technology for displaying on a monitor an overhead image and a prioritized display image based on images around a work vehicle captured by a plurality of cameras.

Prior to describing a work vehicle according to a specific exemplary embodiment of the present invention, a basic technology for displaying on a monitor an overhead image and a prioritized display image based on images around the work vehicle captured by a plurality of cameras attached to the work vehicle will now be described herein with reference to FIG. 1.

This work vehicle includes a vehicle body 1 capable of moving forward and backward, and the vehicle body 1 is equipped with a work apparatus 30. The vehicle body is attached with four cameras 4. The cameras 4 are respectively disposed on a front of the vehicle body 1, a left side of the vehicle body 1, a right side of the vehicle body 1, and a rear of the vehicle body 1. Each of the cameras 4 is equipped with a wide angle lens so that, with the four cameras 4, a whole circumference of the vehicle body 1 can be included in a capturing visual field. As long as the whole circumference of the vehicle body 1 is included in the capturing visual field, the cameras 4 can be reduced in number. The cameras 4 may also be increased in number to adopt a configuration through which the whole circumference of the vehicle body 1 can be captured in further closer capturing directions. The cameras 4 may be disposed on the work apparatus 30, in addition to the vehicle body 1.

The work vehicle works and travels under various work and travel situations. The work and travel situations include, for example, a travel direction, a steering direction, a vehicle speed state, a work apparatus state, and a work field state. These work and travel situations can be detected by various sensors, and these sensors are collectively referred to as a group of work and travel situation detection sensors 9. When the group of work and travel situation detection sensors 9 includes obstruction detection sensors, obstructions present around the work vehicle can be detected. The adopted obstruction detection sensors can be sensors using, for example, an ultrasonic beam, a light beam, or a laser beam, so that an obstruction can be detected, as well as a distance between the vehicle body 1 and the obstruction can be calculated using a detected signal.

This work vehicle is also provided with a satellite positioning function for calculating a coordinate position on a map (hereinafter also referred to as an own position).

Images captured by the four cameras 4 (in FIG. 1, symbols A to D are applied to identify the images captured by the cameras) are converted and composed into an image viewed from a view point positioned above the vehicle body 1 to generate an overhead image where the vehicle body 1 is shown at a center. This overhead image is displayed on a monitor screen to support the driver monitoring situations around the work vehicle. The monitor screen is divided into two adjacent display areas, and the overhead image is displayed on a display area M1 that is one of the display areas. The other display area M2 displays one of the images captured by the four cameras 4 or an image composed with two of the captured images. The captured image displayed in the other display area is herein referred to as a prioritized display image.

One of the images captured by the cameras 4, which includes, in a capturing visual field, an area that should be most focused on in the whole circumference of the vehicle body 1 (focused area) is selected as the prioritized display image. The prioritized display image can be selected manually based on a determination made by the driver. However, in the embodiment of the present invention, to reduce a burden of the driver since the driver should perform many tasks in the work vehicle, a focused area is automatically determined in accordance with work and travel situations, and the prioritized display image is also automatically selected. The driver can still give a selection instruction (through selection buttons A to D, for example) to display on the monitor a captured image that the driver desires as the prioritized display image.

By using signals detected by the group of work and travel situation detection sensors 9, the driver is able to grasp work and travel situations, and, as a result of the obtained information, the driver is able to determine an area that should be most focused on at that time. As an algorithm for determining this focused area, two exemplary methods will now be described herein.

(1) Rule Method

With the rule method, upon one or more particular work situation detection sensors detect a particular work and travel state, a particular area around the vehicle body is regarded as a focused area, one of the images captured by the cameras 4, which includes the particular area as a capturing visual field, is regarded as a prioritized image, and the image is displayed, on a monitor 73, in the second display area positioned next to the first display area displaying an overhead image. For example, (1-1) when the travel direction detection sensor for detecting a forward travel and a backward travel of the vehicle body 1 detects the vehicle body 1 travelling forward, an area in a forward direction is regarded as the focused area. This feature causes the monitor 73 to display the captured image including this area (a front image captured, in a capturing visual field, by one of the cameras 4). Contrarily, when the vehicle body 1 travelling backward is detected, an area in a backward direction is regarded as the focused area, and the captured image including the area (a rear image captured, in a capturing visual field, by one of the cameras 4) is displayed on the monitor 73. As a similar example, when a steering direction detection sensor detects that the work vehicle is steered to a left direction, the left side of the vehicle body 1 is regarded as the focused area, and a left side image captured, in a capturing visual field, by one of the cameras 4, is displayed on the monitor 73. At that time, a front left of the vehicle body 1 is regarded as the focused area, and an image in which a left half of the front image captured, in the capturing visual field, by the one of the cameras 4, and an upper half of the left side image captured, in the capturing visual field, by the one of the cameras 4, are composed may be displayed as the prioritized display image on the monitor 73. Similarly, when the steering direction detection sensor detects that the work vehicle is steered to a right direction, the right side of the vehicle body 1 is regarded as the focused area, and a right side image captured, in a capturing visual field, by one of the cameras 4 is displayed on the monitor 73. In determining the prioritized display image based on a steering direction, a front right (or a front left) of the vehicle body 1 may be regarded as the focused area, and an image in which a right half (or a left half) of the front image captured, in the capturing visual field, by the one of the cameras 4, and an upper half of the right side (or left side) image captured, in the capturing visual field, by the one of the cameras 4, are composed may be displayed as the prioritized display image on the monitor 73.

(1-2) Upon any of the obstruction detection sensors for detecting obstructions around the vehicle body detects an obstruction, an area in a direction toward which the obstruction is detected is regarded as the focused area, and an image of the focused area captured, in a capturing visual field, by one of the cameras 4 is displayed on the monitor 73. A map coordinate position of the obstruction can be obtained by combining a distance between the vehicle body 1 and the obstruction, and a direction, which are calculated based on signals detected by any of the obstruction detection sensors, and an own position calculated through the satellite positioning function. Therefore, when the detected obstruction positions outside the work field, the obstruction does not interfere working and travelling, thus the obstruction can be ignored in this focused area.

(2) Mechanical Learning Method

Since a result of a detection performed by particular one or more of the work and travel situation detection sensors and a focused area are linked beforehand, the rule method is simple in control and lighter in a control burden, thus is beneficial.

However, an area that should be focused on in working and travelling could be affected by many factors. For example, even if the driver steers to left, the driver might want to focus on a rear right area, instead of a left area and a front left area, to check how the vehicle body 1 and the mounted work apparatus 30 move, depending on a steering angle, a vehicle speed, and an orientation of the mounted work apparatus 30. Even in forward travelling, the driver might want to focus on a rear area, rather than a front area, depending on, for example, a kind of work and a vehicle speed. Accordingly, a control system should be configured, where signals detected by many sensors configuring a group of work situation detection sensors (detection results) are used as input parameters to output a focused area. At that time, when taking into account characteristics and other factors of a driver, such a configuration is possible, where, by allowing the driver to actually work and operate the work vehicle, the work vehicle is caused to learn which areas should be focused on in various work and travel situations to determine control parameters.

When the driver wants to focus on a plurality of areas, a plurality of captured images may be circulated in order and each displayed sequentially per a predetermined period on the monitor as the prioritized display image, instead of composing the captured images into a single prioritized display image. At that time, if an attention level can be calculated, the period of display may be changed in accordance with the attention level. If no focused area can be determined, or it seems that a function for determining a focused area is not operable, each of images captured by all of the cameras 4 may be circulated in order and displayed sequentially per a predetermined period on the monitor as the prioritized display image.

Figure 2:
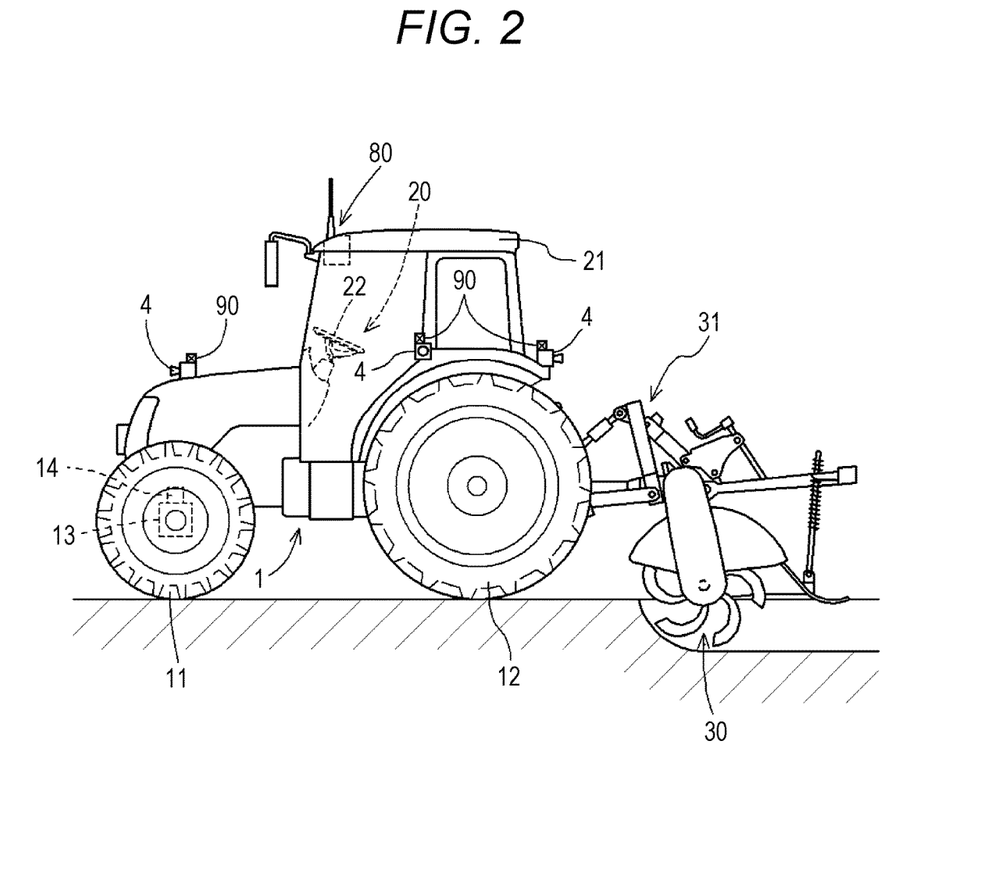
FIG. 2 is a side view of a tractor, an example work vehicle.

Next, with reference to the drawings, a work vehicle according to a specific exemplary embodiment of the present invention will now be described herein. In this exemplary embodiment, the work vehicle is a tractor that travels and works in a field (work field) separated by ridges as boundaries. As shown in FIG. 2, this tractor is provided with an operation unit 20 at a center of a vehicle body 1 supported by front wheels 11 and rear wheels 12. At a rear of the vehicle body 1, a work apparatus 30 that is a rotary tilling machine is equipped via a hydraulic lifting mechanism (a type of orientation changing mechanisms) 31. The front wheels 11 function as steering control wheels through which the tractor changes a travel direction when a steering angle of the steering control wheels is changed. The steering angle of the front wheels 11 is changed by an operation of a steering mechanism 13. The steering mechanism 13 includes a steering motor 14 for automatic steering. For manual travelling, the front wheels 11 can be steered by operating a steering wheel 22 disposed on the operation unit 20. In a cabin 21 of the tractor, a satellite positioning module 80 configured as a global navigation satellite system (GNSS) module is provided. As components of the satellite positioning module 80, a satellite antenna for receiving global positioning system (GPS) signals and GNSS signals is attached at a ceiling area of the cabin 21. The satellite positioning module 80 may include an inertial navigation module incorporated with a gyro acceleration sensor and a magnetic director sensor for complementing satellite navigation. The inertial navigation module may also be provided in a different location from the satellite positioning module 80.

The vehicle body 1 is further attached with four cameras 4 for capturing images around the vehicle body 1. A first camera 4 is disposed at a center of a front (hood) of the vehicle body. A second camera 4 and a third camera 4 are respectively disposed on left and right sides (rear wheel fenders) of the vehicle body. A fourth camera 4 is disposed at a center of the rear (a rear edge of a cabinet) of the vehicle body. Each of the cameras 4 uses an image element such as a charge coupled device (CCD) or a CMOS image sensor (CIS) to capture two-dimensional images at a speed of 15 frames to 30 frames per second in a time sequence manner, and to digital convert and output the captured images in real time. A capturing optical axis of each of the cameras 4 is directed downwardly so that the capturing visual fields include parts of the vehicle body 1 and the work apparatus 30, in addition to a field surface, and a wide angle lens is attached to each of the cameras 4. Thus images captured by the four cameras 4 can cover a whole circumference area around the vehicle body. In this exemplary embodiment, obstruction detection sensors 90 configured as laser radars are respectively attached adjacent to the cameras 4. The obstruction detection sensors 90 each have a scan range exceeding 90°, so that the four obstruction detection sensors 90 can detect obstructions present in the whole circumference area around the vehicle body.

Figure 3:
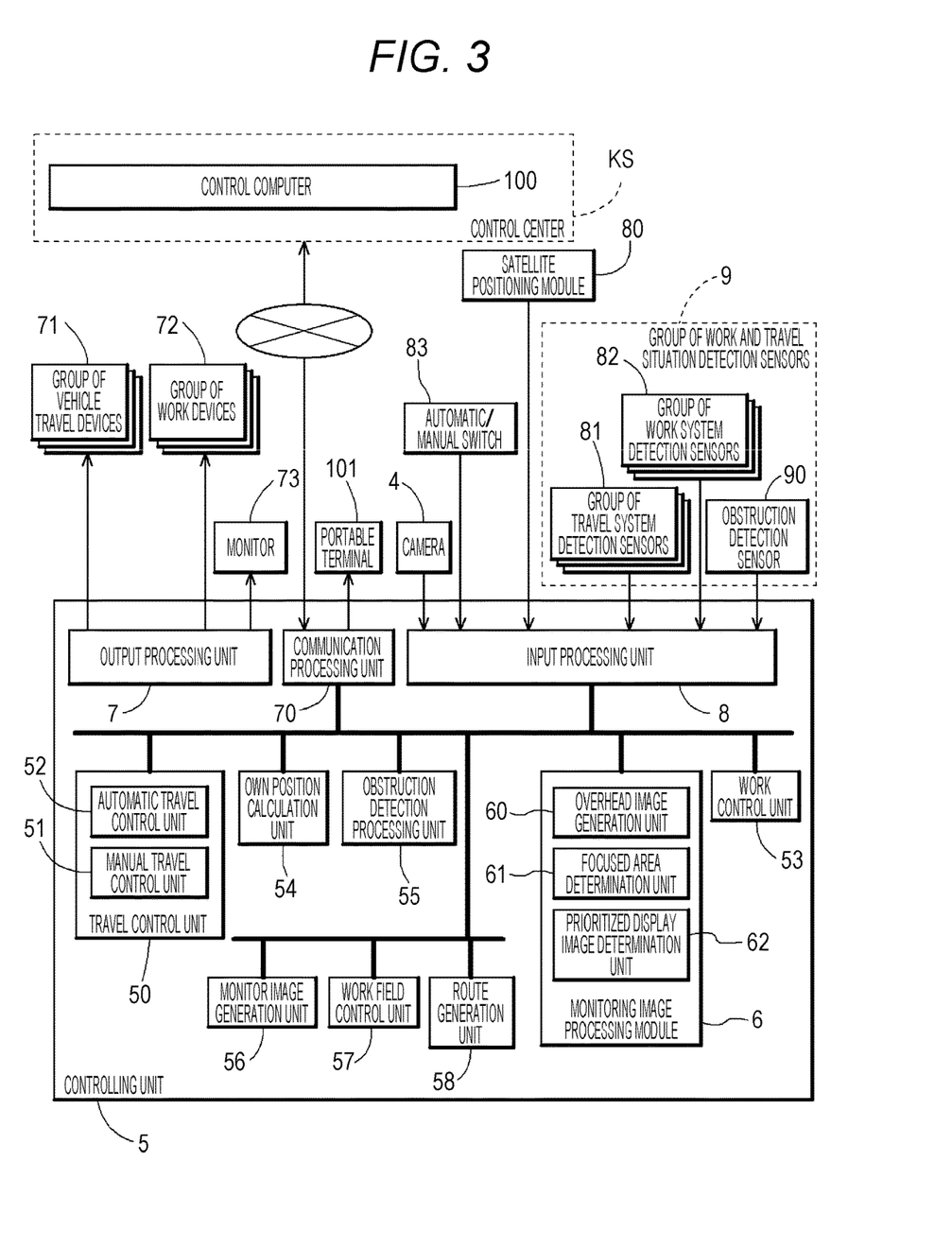
FIG. 3 is a functional block diagram illustrating a control system of the tractor.

FIG. 3 illustrates a control system configured in this tractor. This control system is incorporated with the basic technology through which, as described with reference to FIG. 1, the overhead image and the prioritized display image generated based on images around the work vehicle captured by the plurality of cameras 4 are displayed on the monitor 73. A controlling unit 5 that is a core element of this control system includes an output processing unit 7 and an input processing unit 8, which respectively function as input and output interfaces, as well as includes a communication processing unit 70. The output processing unit 7 is connected with, for example, a group of vehicle travel devices 71, a group of devices 72, and the monitor 73 configured with a flat panel such as liquid crystal. Although not shown in the drawings, the output processing unit 7 is coupled with a lamp and a speaker for notifying an alert on work and travel to the driver and a supervisor. The group of vehicle travel devices 71 includes the steering motor 14, and, although not shown in the drawings, devices to be controlled for allowing the work vehicle to travel, such as a transmission mechanism and an engine unit. The group of work devices 72 includes, for example, a drive mechanism for the work apparatus 30, and a lifting mechanism 31 for raising and lowering the work apparatus 30.

The communication processing unit 70 exchanges data with an external computer in conformity to a wireless communication standard and a wired communication standard. FIG. 3 shows a control computer 100 configured as an external computer in a control center KS or another facility in a remote location, and a portable terminal 101 that may be a tablet computer or a smartphone (mobile phone) held by the driver or the supervisor.

The input processing unit 8 is coupled to, for example, the above described cameras 4, the satellite positioning module

80, an automatic/manual switch 83, and the group of work and travel situation detection sensors 9. The group of work and travel situation detection sensors 9 includes the above described obstruction detection sensors 90, in addition to a group of travel system detection sensors 81 and a group of work system detection sensors 82. The group of travel system detection sensors 81 includes sensors for detecting travel states such as a steering angle, an engine speed, and a transmission state. The group of work system detection sensors 82 includes, for example, sensors for detecting a ground clearance and an inclination of the work apparatus 30, and sensors for detecting workloads. The automatic/manual switch 83 is a switch for selecting either an automatic travel mode for travelling with automatic steering or a manual travel mode for travelling with manual steering. For example, operating the automatic/manual switch 83 while the work vehicle is travelling with the automatic travel (automatic steering) mode causes the work vehicle to switch to travelling with manual steering, and operating the automatic/manual switch 83 while the work vehicle is travelling with manual steering causes the work vehicle to switch to travelling with automatic steering.

As the core function for achieving the basic technology described with reference to FIG. 1, the controlling unit 5 is configured to include a monitoring image processing module 6, an obstruction detection processing unit 55, and a monitor screen generation unit 56. The controlling unit 5 is also configured to additionally include a travel control unit 50, a work control unit 53, an own position calculation unit 54, a work field control unit 57, and a route generation unit 58.

Since the automatic travel (automatic steering) mode and the manual travel (manual steering) mode are both configured to be available in this tractor for travelling, the travel control unit 50 for controlling the group of vehicle travel devices 71 includes a manual travel control unit 51 and an automatic travel control unit 52. In accordance with operations of the driver, the manual travel control unit 51 controls the group of vehicle travel devices 71, based on the operation performed by the driver. Based on a deviation between an own position and a travel route, the automatic travel control unit 52 generates and outputs an automatic steering instruction to the steering motor 14 via the output processing unit 7. To control movement of the work apparatus 30, the work control unit 53 provides control signals to the group of work devices 72.

The travel control unit 50 executes a control process that differs between the automatic travel (automatic steering) mode and the manual travel (manual steering) mode. In the automatic travel (automatic steering) mode, a function is achieved, through which an own position calculated by the own position calculation unit 54 and a travel route generated by the route generation unit 58 are compared and evaluated, and, if a positional difference arises between the own position and the travel route, steering shift data is generated and provided to the automatic travel control unit 52 so that the vehicle body 1 travels along the travel route.

Based on the satellite positioning data sent from the satellite positioning module 80, the own position calculation unit 54 calculates an own position.

Based on the detected signals sent from the four obstruction detection sensors 90, the obstruction detection processing unit 55 detects an obstruction present around the vehicle body 1. Since the obstruction detection sensors 90 are of a horizontal scan type in this exemplary embodiment, the obstruction detection processing unit 55 can calculate both a width in a horizontal direction of the detected obstruction, and a distance from the vehicle body 1. By referring to the own position sent from the own position calculation unit 54 and map coordinates of boundaries in the work field, which are sent from the work field control unit 57, the obstruction detection processing unit 55 can further determine whether the detected obstruction is present within the work field. That is, by using the own position and the map coordinates of the boundaries in the work field, an area outside the work field, which can still be detected by the obstruction detection sensors 90, can be set as an area from which any obstruction is not necessarily detected so that obstructions present outside the work field are not detected. If the detected obstruction is present in a forward direction of the work vehicle, the obstruction detection processing unit 55 further provides obstruction detection information to the travel control unit 50. Based on the obstruction detection information, the travel control unit 50 may be configured to slow, stop, or steer the work vehicle for avoidance.

The work field control unit 57 controls field information (work field information) that is information regarding the field in which the work vehicle works and travels. The field information includes data such as a map position, shape, and size of a field, in addition to plant varieties, and can be downloaded from the control computer 100 disposed in the control center KS in the remote location or a farmer's home, or the portable terminal 101 held by the driver.

Based on the field information, the route generation unit 58 reads external shape data of the field, and generates a travel route that fits to this field. This travel route may be generated automatically based on basic, initial parameters entered by an operator, or based on input parameters substantially defining a travel route entered by the operator. A configuration may be adopted, through which a travel route itself is downloaded from the control computer 100. In any case, the travel route obtained from the route generation unit 58 is developed in a memory, and used by the work vehicle to travel along the travel route regardless of travelling in either the automatic travel (automatic steering) mode or the manual travel (manual steering) mode.

The monitoring image processing module 6 includes an overhead image generation unit 60, a focused area determination unit 61, and the monitor screen generation unit 56. The overhead image generation unit 60 view-point converts images captured by the four cameras 4 into other images in which respective view points are shifted to positions above a center of the vehicle body, and composes the view-point converted images to generate an overhead image through which an area around the work vehicle can be viewed from above. Although a mapping table is used for view point conversions, by changing the mapping table in accordance with a type of the work apparatus 30 or a type of work, an overhead image that fits to work and travel operation in each case can be generated.

Based on signals detected by the group of work and travel situation detection sensors 9, the focused area determination unit 61 determines a focused area. Since the group of work and travel situation detection sensors 9 includes the group of travel system detection sensors 81, the group of work system detection sensors 82, and the obstruction detection sensors 90, the controlling unit 5 accepts inputs of detection results with regard to a state of the lifting mechanism 31, a state of the work apparatus 30 (e.g., lowered position, lifted position), a state of the steering mechanism 13 (e.g., left turn, right turn, quick turn, slow turn), a driving state to the rear wheels 12 (e.g., forward movement, backward movement, low-speed, high-speed movement), presence of an obstruction (e.g., distance to detected object from vehicle body 1, direction of detected object relative to vehicle body 1).

Therefore, the focused area determination unit 61 can use these detected results as input parameters, and, based on a predetermined rule, determine and output an area that should be focused on in the whole circumference of the vehicle body at that time. In basic rule settings, a focused area is a front area when forward travelling, a rear area when backward travelling, a left area when turning to left, or a right area when turning to right. In addition, when the work apparatus 30 moves from a lifted position to a lowered position, a focused area will preferentially be the rear area. When an obstruction is determined to be present in an area in a predetermined distance from the vehicle body 1, based on a distance and a direction of the obstruction detected by the obstruction detection sensors 90, a focused area will preferentially be an area in which the obstruction is present.

The prioritized display image determination unit 62 regards an image captured by one of the cameras 4, where a focused area determined by the focused area determination unit 61 is included in a capturing visual field, as a prioritized display image to be displayed on the monitor 73 together with an overhead image. To this end, a table is provided for indicating that which of captured images includes any focused area determined by the focused area determination unit 61, so that one of the captured images, which includes the image that should be focused on, can be identified from a determined focused area. Specifically, each of images captured by the four cameras 4 is divided into one or more sections, and the sections are each applied with an identification code, and, simultaneously, the focused area determined by the focused area determination unit 61 is specified by one of the identification codes. For example, the focused area is represented by one of the identification codes specifying one or more sections in an image captured by particular one of the cameras 4. That is, this identification code indicating the focused area identifies particular one of the sections in the image captured by the particular one of the cameras 4. When a captured image is not divided into sections, but has only one section, a focused area can be selected by simply specifying one of the cameras 4. When a captured image is divided into a plurality of sections, and a focused area specifies one of the sections, the section may be cut out from the captured image to regard the section as a prioritized display image. In addition, when a plurality of identification codes each represents a focused area, and the plurality of identification codes respectively represents sections in two images captured by adjacent two of the cameras, the captured images can be specified and composed into a single image to regard the image as a prioritized display image. That is, the prioritized display image determination unit 62 has a function for magnifying or reducing a captured image including a focused area to regard the image as a prioritized display image.

The monitor screen generation unit 56 generates a monitor screen displaying on the monitor 73 images captured by the four cameras 4. As schematically shown in FIG. 1, the monitor screen generation unit 56 divides the monitor screen into the first display area M1 and the second display area M2, which are adjacent to each other, assigns in the first display area M1 an overhead image generated by the overhead image generation unit 60, and assigns in the second display area M2 the prioritized display image determined by the prioritized display image determination unit 62.

While the work vehicle is operated manually, the driver can check, through the monitor 73, the overhead image and the captured image of an area that should be focused on. While the work vehicle is operated automatically, a supervisor supervising the automatic operation from inside or outside the cabin can check, through a display of the portable terminal 101, the monitor screen showing the overhead image and the captured image generated by the monitor screen generation unit 56 and sent via the communication processing unit 70.

Figure 4:
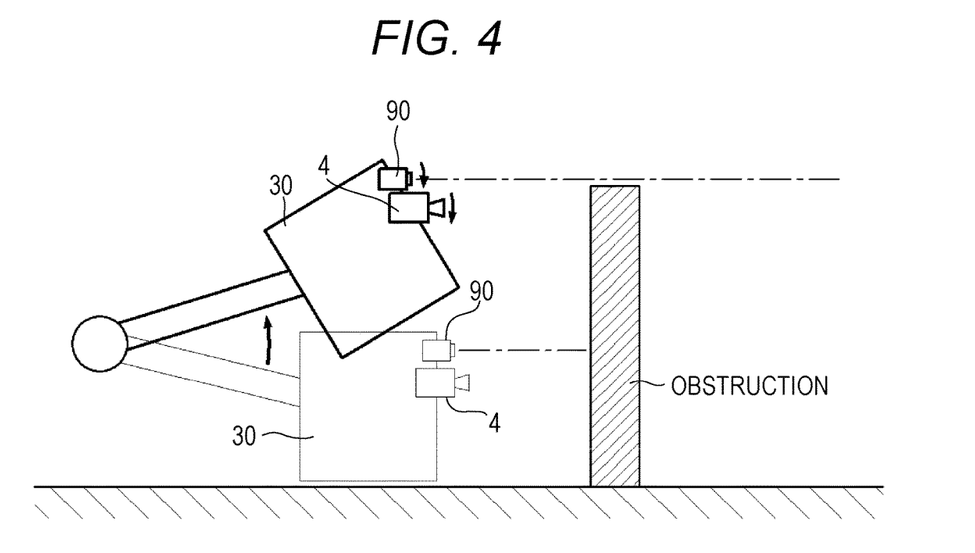
FIG. 4 is a view illustrating a form of use of a camera and an obstruction detection sensor attached to a work apparatus that lifts and lowers.

Other Exemplary Embodiments (1) In the above described exemplary embodiment, the cameras 4 and the obstruction detection sensors 90 are fixed to the vehicle body 1. Instead of this configuration, at least one of the cameras 4 and at least one of the obstruction detection sensors 90 can be attached to the work apparatus 30 that lifts and lowers through the lifting mechanism (a type of orientation changing mechanisms) 31 to change its orientation. When this work apparatus 30 lifts, the orientation shifts from a horizontal orientation to an inclined orientation. In an example shown in FIG. 4, one of the cameras (work apparatus cameras) 4 and one of the obstruction detection sensors (work apparatus obstruction detection sensors) 90 are attached to a rear of the work apparatus 30 via a swing mechanism. This swing mechanism has a swing axial center extending in a transverse direction of the vehicle body, and swings in conjunction with a movement of the lifting mechanism 31 to offset an inclination that occurs as the work apparatus 30 lifts. That is, the swing mechanism is configured so that, after the work apparatus 30 lifts, a direction of a capturing optical axis of the camera 4 and a direction toward which a beam is irradiated of the obstruction detection sensor 90 are kept un-shifted from when the work apparatus 30 was lowered, thus a capturing visual field of the camera 4 and a scan area of the obstruction detection sensor 90 are almost maintained.

Figure 5:
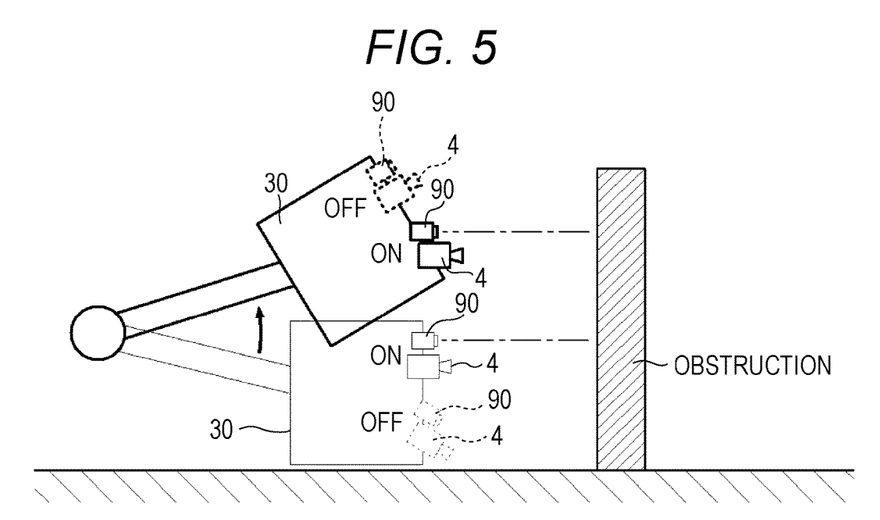
FIG. 5 is a view illustrating another form of use of cameras and obstruction detection sensors attached to a work apparatus that lifts and lowers.

In an example shown in FIG. 5, two pairs of the cameras 4 and the obstruction detection sensors 90 are provided. A first (upper) pair of the camera 4 and the obstruction detection sensor 90 is fixed to the work apparatus 30 so that an optimum capturing direction and a detection direction can respectively be achieved when the work apparatus 30 is in a lowering orientation. A second (lower) pair of the camera 4 and the obstruction detection sensor 90 is fixed to the work apparatus 30 so that an optimum capturing direction and a detection direction can be achieved when the work apparatus 30 is in a lifting orientation. When the work apparatus 30 is in the lowering orientation, the controlling unit 5 turns on the first pair of the camera 4 and the obstruction detection sensor 90, while the controlling unit 5 turns off the second pair of the camera 4 and the obstruction detection sensor 90. Contrarily, when the work apparatus 30 is in the lifting orientation, the controlling unit 5 turns on the second pair of the camera 4 and the obstruction detection sensor 90, while the controlling unit 5 turns off the first pair of the camera 4 and the obstruction detection sensor 90.

(2) The prioritized display image determination unit 62 may has a function for magnifying or reducing in an arbitrary manner a captured image including a focused area (change in magnification/reduction rate for display) to regard the image as a prioritized display image. At that time, since the greater a travel speed, the faster an object comes closer, it is advantageous that an entire area of the captured image is regarded as a prioritized display image (reduced image) when high speed travelling is determined based on a signal sent from the vehicle speed detection sensor included in the group of work and travel situation detection sensors 9. Contrarily, when low speed travelling is determined, it is advantageous that a partial area narrowed down into a focused area in a captured image is magnified to regard the area as prioritized display image (magnified image).

(3) Each function unit in the functional block diagram shown in FIG. 3 is separated for description purposes. In an actual case, each function unit can be integrated with other function units, or divided into a plurality of sub-function units.

(4) The above described exemplary embodiments have appointed, as the work vehicle, a tractor equipped with a rotary tilling machine as the work apparatus 30. However, in addition to such a tractor, various work vehicles may be adopted as exemplary embodiments, such as agricultural vehicles including rice transplanters, fertilizer distributors, combines, and construction vehicles equipped with a dozer or a roller as the work apparatus 30.

INDUSTRIAL APPLICABILITY

The embodiments of the present invention are applicable to a work vehicle that uses a plurality of cameras to display an overhead image on a monitor.

According to one aspect of the present invention, a vehicle body, cameras, work and travel situation detection sensors, at least one monitor, and circuitry. The cameras are provided on the vehicle body to capture images around the vehicle body. The work and travel situation detection sensors are provided on the vehicle body to detect work and travel situations. The at least one monitor is provided in the vehicle body to display at least one monitor display image. The circuitry is configured to determine a focused area based on signals detected by the work and travel situation detection sensors. The circuitry is configured to determine a prioritized display image among the images captured by the cameras, the prioritized display image including the focused area. The circuitry is configured to compose the images captured by the cameras by view-point converting the images to generate an overhead image around the vehicle body. The circuitry is configured to generate the at least one monitor display image including a first display area in which the overhead image is displayed and a second display area in which the prioritized display image is displayed.

According to this configuration, an area to which the driver should focus on at that time is determined based on signals detected by and output from the group of various sensors for detecting work and travel states of this work vehicle, and a captured image including the area that should be focused on is displayed on the monitor together with the overhead image. With a work vehicle, compared with passenger cars and other vehicles running on roads, an area that should be focused on in the whole circumference of the vehicle body changes from moment to moment, due to frequent shifting of travel directions, steering maneuvers, changes in vehicle speeds, operations of a work apparatus, and other operations. This means that such an area to which the driver should be focused on has a close relation to signals detected by the group of sensors for detecting work and travel situations. Accordingly, through the prioritized display image that includes the focused area determined by the focused area determination unit, and that is displayed on the monitor together with the overhead image, the driver is able to know a situation in an area around the vehicle body from the overhead image, and to simultaneously know, from the prioritized display image, an area that should be particularly focused on.

What the driver should first be conscious in working and traveling with the work vehicle is a situation of an area in a travel direction (an area in front of the vehicle body when forward travelling). According to an advantageous exemplary embodiment of the present invention, therefore, the group of work and travel situation detection sensors includes a travel direction detection sensor that detects forward travelling and backward travelling of the vehicle body, and the focused area determination unit determines, as the focused area, an area in a forward direction when forward travelling is detected, and determines, as the focused area, an area in a backward direction when backward travelling is detected. Since the work vehicle might often be moved forward and backward repeatedly, automatically displaying, on the monitor, a captured image showing an area in a travel direction depending on the travel direction (forward or backward) of the work vehicle to allow the driver to confirm the image as a prioritized display image is advantageous.

Different from roads, a work field includes various obstructions for travelling, such as boundary fences and ridges. To avoid these obstructions, an obstruction detection sensor is often mounted as a work and travel situation detection sensor. However, when the obstruction detection sensor detects some kind of an obstruction and outputs a signal, the driver is required to visually check the obstruction to determine whether the work vehicle should be stopped, kept traveled, or turned to another direction to avoid the obstruction. On the other hand, when a plurality of obstruction detection sensors having different sighting directions is mounted, the driver might not sometimes be able to determine promptly which direction should be focused on. To solve this problem, according to another advantageous exemplary embodiment of the present invention, the group of work and travel situation detection sensors includes obstruction detection sensors that detect an obstruction around the vehicle body, and when any of the obstruction detection sensors detects an obstruction, an area in a direction toward which the obstruction is detected is determined as the focused area. This feature advantageously displays on the monitor as the prioritized display image a captured image showing an area in sight of any of the obstruction detection sensors that has detected the obstruction.

When the work vehicle travels in a work field for some kind of work, obstructions present outside the work field can be ignored. A distance to an obstruction can generally be calculated based on signals detected by the obstruction detection sensors. Therefore, if the work vehicle is equipped with a function of calculating with map coordinates an own position using, for example, a satellite positioning system, the work vehicle can determine whether an obstruction is present inside or outside the work field. According to still another advantageous exemplary embodiment of the present invention, therefore, the work vehicle includes an own position calculation unit that calculates a position of the vehicle body based on satellite positioning data, and when a distance between the vehicle body and the obstruction detected by the obstruction detection sensors is greater than a distance between the vehicle body and a boundary of the work field, the focused area is cancelled. This feature can prevent unnecessary obstructions from being displayed on the monitor.

When adjacent cameras are disposed so that respective parts of capturing visual fields overlap each other, an area in which images captured by the respective cameras overlap might be regarded as a focused area. In such a case, determining which of the captured images is more effective might be difficult. At that time, an effective measure is to make a configuration where, when the focused area is included in capturing visual fields of two or more of the cameras, each of the images captured by the cameras is shown sequentially per a predetermined period as the prioritized display image. Another effective measure is to make a configuration where, when the focused area is included in the capturing visual fields of the two or more of the cameras, an image composed with the images captured by the cameras is shown as the prioritized display image. At that time, proportionally dividing the respective captured images with a number of the cameras (for example, when two of the cameras have captured images, dividing the images into halves) and composing the divided parts advantageously prevent a composed image from being reduced. By adopting such measures as an advantageous exemplary embodiment, the driver is able to securely view the focused area.

As a measure if no focused area can be determined, i.e., in a plurality of captured images, no distinct difference can be observed in respective attention degrees, according to still another advantageous exemplary embodiment of the present invention, when no focused area can be determined, images captured by all of the plurality of cameras are each shown sequentially per a predetermined period as the prioritized display image.

In some cases, a work vehicle is equipped with a work apparatus that changes in orientation relative to a vehicle body. When the work apparatus of the work vehicle is attached with a camera, and the work apparatus changes in orientation, a capturing direction of the camera also changes, thus an optimum area could not be captured. To avoid such a problem, according to still another advantageous exemplary embodiment of the present invention, the vehicle body is equipped with the work apparatus via an orientation changing mechanism, at least one of the cameras is attached as a work apparatus camera to the work apparatus, and the work apparatus camera is changed in orientation in accordance with a change in orientation of the work apparatus so that the capturing direction is maintained. When the work apparatus is further attached with an obstruction detection sensor, a detection direction of the obstruction detection sensor is required to be kept in an optimum direction regardless of a change in orientation of the work apparatus. To achieve this configuration, according to still another advantageous exemplary embodiment of the present invention, the vehicle body is equipped with the work apparatus via an orientation changing mechanism, at least one of the cameras is attached as a work apparatus camera to the work apparatus, at least one of the obstruction detection sensors is attached as an obstruction detection sensor to the work apparatus, the work apparatus camera is changed in orientation in accordance with a change in orientation of the work apparatus so that a capturing direction is maintained, and the obstruction detection sensor is changed in orientation in accordance with the change in orientation of the work apparatus so that a direction toward which the obstruction is detected is maintained.

A work vehicle travels, depending on a kind of work, at a speed in a wider range from a super low speed to a medium speed. At a super low speed, a screen is difficult to flow because a captured screen displayed on the monitor as a prioritized display image moves only a small amount per a period. However, the faster a speed, the greater the captured screen moves per the period, thus, the screen flows. This means that, when a travel speed increases, it is advantageous for the driver to view a wider area in a single screen. To this end, according to still another advantageous exemplary embodiment of the present invention, the group of work and travel situation detection sensors includes a vehicle speed detection sensor that detects a travel speed of the vehicle body so that a magnification and reduction rate of displaying the prioritized display image in the second display area changes in accordance with the travel speed detected by the vehicle speed detection sensor.

Obviously, numerous modifications and variations of the present invention are possible in light of the above teachings. It is therefore to be understood that within the scope of the appended claims, the invention may be practiced otherwise than as specifically described herein.

What is claimed is:

1. A work vehicle comprising:
a vehicle body;
cameras provided on the vehicle body, each of cameras being configured to capture images of each of detection areas around the work vehicle;
obstruction detection sensors provided on the vehicle body to detect an obstruction with respect to the work vehicle;
at least one monitor provided in the vehicle body to display at least one monitor display image;
a memory to store a map defining a work field in which the work vehicle is to work; and
circuitry configured to
calculate a vehicle position of the work vehicle based on satellite positioning data,
determine whether the obstruction detected by the obstruction detection sensors is inside the work field based on the map;
determine a focused area in which the obstruction is detected among the detection areas if the obstruction is determined to be inside the work field,
determine a prioritized display image among the images captured by the cameras, the prioritized display image including the focused area,
generate an overhead image showing the work vehicle and a peripheral area around the work vehicle by view-point converting the images captured by the cameras and compositing the images which have been view-point converted, and
generate the at least one monitor display image including a first display area in which the overhead image is displayed and a second display area in which the prioritized display image is displayed.

2. The work vehicle according to claim 1, further comprising:
a travel direction detection sensor to detect forward travelling and backward travelling of the work vehicle,
wherein the circuitry determines an area in front of the vehicle body as the focused area when the forward travelling is detected, and determines an area in the rear of the vehicle body as the focused area when the backward travelling is detected.

3. The work vehicle according to claim 1, wherein, when a first camera of the cameras captures the focused area and a second camera of the cameras captures an additional focused area in which the obstruction is detected among the detection areas if the obstruction is determined to be inside the work field, each of the images captured by the first camera and the second camera is displayed sequentially per a predetermined period as the prioritized display image.

4. The work vehicle according to claim 1, wherein, when a first camera of the cameras captures the focused area and a second camera of the cameras captures an additional focused area in which the obstruction is detected among the detection areas if the obstruction is determined to be inside the work field, a composite image composed with the images captured by the first camera and the second camera is displayed as the prioritized display image.

5. The work vehicle according to claim 1, wherein, when no focused area can be determined, images captured by all of the cameras are each displayed sequentially per a predetermined period as the prioritized display image.

6. A work vehicle comprising:
a vehicle body having a base direction;
a work apparatus movably mounted to the vehicle body to be in contact with and apart from a work field that the work vehicle is to work, an orientation of the work apparatus with respect to the vehicle body being changeable in accordance with a height of the work vehicle with respect to the work field;
cameras provided on the vehicle body, each of the cameras being configured to capture images of each of detection areas around the work vehicle, the cameras including a work apparatus camera having an optical axis and rotatably mounted on the work apparatus such that the optical axis of the work apparatus camera is controlled to be substantially parallel to the base direction regardless of the orientation of the work apparatus with respect to the vehicle body;
obstruction detection sensors provided on the vehicle body to detect an obstacle around the vehicle body;
at least one monitor provided in the vehicle body to display at least one monitor display image; and
circuitry configured to
determine a focused area in which the obstruction is detected among the detection areas,
determine a prioritized display image among the images captured by the cameras, the prioritized display image including the focused area,
generate an overhead image showing the work vehicle and a peripheral area around the work vehicle by view-point converting the images captured by the cameras and compositing the images which have been view-point converted, and
generate the at least one monitor display image including a first display area in which the overhead image is displayed and a second display area in which the prioritized display image is displayed.

7. The work vehicle according to claim 6,
wherein the obstruction detection sensors include a work apparatus obstruction detection sensor configured to emit a signal in a signal emitting direction and rotatably mounted on the work apparatus such that the signal emitting direction is controlled to be substantially parallel to the base direction regardless of the orientation of the work apparatus with respect to the vehicle body.

8. The work vehicle according to claim 1, further comprising:
a vehicle speed detection sensor to detects a travel speed of the work vehicle, and
wherein a magnification and reduction rate of displaying the prioritized display image in the second display area changes in accordance with the travel speed detected by the vehicle speed detection sensor.

9. An image displaying method for a work vehicle, comprising:
capturing vehicle surrounding images of detection areas around a vehicle body of the work vehicle, respectively;
detecting an obstruction with respect to the work vehicle;
calculating a vehicle position of the work vehicle based on satellite positioning data,
determining whether the obstruction detected is inside a work field in which the work vehicle is to work based on a map defining the work field,
determining a focused area in which the obstruction is detected among the detection areas if the obstruction is determined to be inside the work field;
determining a prioritized display image among the vehicle surrounding images, the prioritized display image including the focused area;
generate an overhead image showing the work vehicle and a peripheral area around the work vehicle by view-point converting the vehicle surrounding images and compositing the vehicle surrounding images which have been view-point converted; and
generating at least one monitor display image including a first display area in which the overhead image is displayed and a second display area in which the prioritized display image is displayed; and
displaying the at least one monitor display image in at least one monitor.

\* \* \* \* \*